United States Patent
Jablon et al.

(10) Patent No.: US 10,081,578 B2
(45) Date of Patent: Sep. 25, 2018

(54) WAX-BASED FERTILIZER COATINGS WITH POLYETHYLENE- OR POLYPROPYLENE-BASED POLYMERS

(71) Applicant: Honeywell International Inc., Morristown, NJ (US)

(72) Inventors: Michael Jablon, Ramsey, NJ (US); Maria Anatolyevna Azimova, Richmond, VA (US); Gerald Smith, Easton, PA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 88 days.

(21) Appl. No.: 15/145,598

(22) Filed: May 3, 2016

(65) Prior Publication Data
US 2016/0340266 A1 Nov. 24, 2016

Related U.S. Application Data

(60) Provisional application No. 62/165,359, filed on May 22, 2015.

(51) Int. Cl.
C05G 3/00 (2006.01)
C05C 3/00 (2006.01)

(52) U.S. Cl.
CPC ............ *C05G 3/0029* (2013.01); *C05C 3/005* (2013.01); *C05G 3/0035* (2013.01); *C05G 3/0088* (2013.01)

(58) Field of Classification Search
CPC .. C05G 3/0029; C05G 3/0088; C05G 3/0035; C05C 3/005
See application file for complete search history.

(56) References Cited

U.S. PATENT DOCUMENTS

| 2,885,293 | A | * | 5/1959 | Haskell | B65D 25/14 |
| | | | | | 220/62.11 |
| 4,019,890 | A | | 4/1977 | Fujita et al. | |
| 4,082,533 | A | | 4/1978 | Wittenbrook et al. | |
| 5,211,985 | A | | 5/1993 | Shirley et al. | |
| 5,264,019 | A | | 11/1993 | Gossett et al. | |

(Continued)

FOREIGN PATENT DOCUMENTS

| CN | 101050148 A | 10/2007 |
| EP | 255665 B1 | 10/1991 |

(Continued)

OTHER PUBLICATIONS

The International Search Report dated Aug. 8, 2016 in International Application No. PCT/US2016/031709.

(Continued)

*Primary Examiner* — Jennifer A Smith
(74) *Attorney, Agent, or Firm* — Lorenz & Kopf, LLP

(57) ABSTRACT

Disclosed is a hydrophobic coating material that includes a wax-based material and a polyethylene- or polypropylene-based polymer material. Also disclosed is a coated fertilizer composition that includes a fertilizer granule and the hydrophobic coating material coated on the fertilizer granule. Further disclosed is a method of manufacturing a coated fertilizer composition that includes the steps of providing a fertilizer granule and coating the fertilizer granule with the hydrophobic coating material.

11 Claims, 2 Drawing Sheets

(56) References Cited

U.S. PATENT DOCUMENTS

| | | | | |
|---|---|---|---|---|
| 5,698,005 A | * | 12/1997 | Schapira | ............... B01J 2/30 |
| | | | | 252/384 |
| 5,917,110 A | | 6/1999 | Kust | |
| 6,475,259 B1 | | 11/2002 | Thomas et al. | |
| 6,500,223 B1 | | 12/2002 | Sakai et al. | |
| 2014/0137616 A1 | | 5/2014 | Peacock et al. | |

FOREIGN PATENT DOCUMENTS

| | | |
|---|---|---|
| EP | 0574306 B1 | 8/1997 |
| EP | 692468 B1 | 11/1998 |
| GB | 1429765 A | 3/1976 |
| GB | 1470652 A | 4/1977 |
| JP | 9328386 B2 | 12/1997 |
| JP | 2003246692 A | 9/2003 |
| JP | 04097302 B2 | 6/2008 |
| JP | 04411706 B2 | 2/2010 |

OTHER PUBLICATIONS

S.M. Al-Zahrani, Utilization of polyethylene and paraffin waxes as controlled delivery systems for different fertilizers, Chemical Engineering Department, King Saud University, P.O. Box 800, Riyadh 11421, Saudi Arabia, Ind. Eng. Chem Res 2000, 39, 367-371.

Omar A. Salman, Polyethylene-Coated Urea. 1. Improved Storage and Handling Properties, Products Department, Petroleum Petrochemicals and Materials Division, Kuwait Institute for Scientific Research, P.O. Box 24885, 13109 Safat, Kuwait, Ind. Eng. Chem. Res. 1989, 28, 630-632.

* cited by examiner

WAX-BASED FERTILIZER COATINGS WITH POLYETHYLENE- OR POLYPROPYLENE-BASED POLYMERS

CROSS-REFERENCE TO RELATED APPLICATIONS

This application claims the benefit of U.S. provisional application Ser. No. 62/165,359, filed on May 22, 2015, the contents of which are herein incorporated by reference in their entirety.

TECHNICAL FIELD

The present disclosure relates to agricultural products such as fertilizers and fertilizer coatings. More particularly, the present disclosure provides wax-based fertilizer coatings that incorporate polyethylene- or polypropylene-based polymers to reduce water uptake into the fertilizer granules and to prevent granule caking and dusting.

BACKGROUND

Conventional fertilizers are granulated or compacted from mixtures of the constituent nutrients that are utilized to form the fertilizers. In some formulations, various additives, such as crop chemicals or "agrochemicals" are added to the mixtures in order to achieve additional goals in the plant products beyond fertilization. In many instances, the agrochemicals are added to the mixture of constituent nutrients and then granulated or compacted with the mixture to yield a finished product. Inorganic fertilizers such as ammonium sulfates, ammonium nitrates, potassium nitrates, potassium chlorides, potassium sulfates, and the like, all are well known. Methods of manufacturing these inorganic fertilizers, as well as methods of processing the fertilizers into particles via prill and granulation techniques, also are well known.

Particulate or granulated fertilizers, stored in bulk, will absorb moisture from the atmosphere at rates depending on the chemical composition of the fertilizer, temperature of the fertilizer, and the vapor pressure of water in the air (i.e., relative humidity in the environs where the fertilizer is stored). Also, the granular fertilizer particles often tend to cake when stored and transported in bulk such that substantial amounts of the initial free-flowing particulate fertilizer agglomerates into solid, substantially integral masses. This is colloquially referred to in the art as "caking" of the fertilizer. Softened granule can experience greater degree of abrasion and dusting. Thus, due to the incidence of caking and dusting, it is generally understood that the quality of particulate fertilizers may be improved by reducing their moisture content during production and by preventing moisture absorption during storage. This is especially true for fertilizers stored in large bulk piles where no dehumidification is provided, as is common practice in the industry.

One common method to prevent moisture absorption into the fertilizer granules is the application of oils or waxes to the fertilizer granules. Oils and waxes, being inherently hydrophobic, serve to protect the fertilizer granules from atmospheric moisture. However, due to the varied size and shape of fertilizer granules, and due to processing and storage conditions, it has been observed that the application of oils and waxes cannot fully prevent moisture absorption. As such, even with this application, water uptake, and the resultant caking and dusting, have remained a problem.

Thus, there remains a need in the art for improved fertilizer coatings and improved methods for manufacturing fertilizer coatings. Particularly, it would be desirable to provide fertilizer coatings that more fully inhibit the uptake of water, thereby reducing the incidence of dusting and caking, as compared with prior art coatings based solely on waxes or oils. Still further, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In one exemplary embodiment, a fertilizer coating composition includes a wax-based material and a polyethylene- or polypropylene-based polymer material. In another exemplary embodiment, a coated fertilizer composition includes a fertilizer granule and a hydrophobic coating material coated on the fertilizer granule. The hydrophobic coating material includes a wax-based material and a polyethylene- or polypropylene-based polymer material. In yet another exemplary embodiment, a method of manufacturing a coated fertilizer composition includes the steps of providing a fertilizer granule and coating the fertilizer granule with a hydrophobic coating material. The hydrophobic coating material includes a wax-based material and a polyethylene- or polypropylene-based polymer material.

This brief summary is provided to introduce a selection of concepts in a simplified form that are further described below in the detailed description. This brief summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The present disclosure provides wax- or oil-based fertilizer coatings having one or more polyethylene- or polypropylene-based polymers. The novel fertilizer coatings described herein provide better hydrophobic properties to the fertilizer coating, better adhesion to the granule, and better flow of the coating, leading to a more uniform coating and better moisture resistance. These polymers, which when incorporated into fertilizer coatings, also lower the coefficient of friction of the coating, allowing faster and easier transport through the farming equipment, and less dusting by decreasing abrasions resulting from particle to particle contact.

Figure 1:
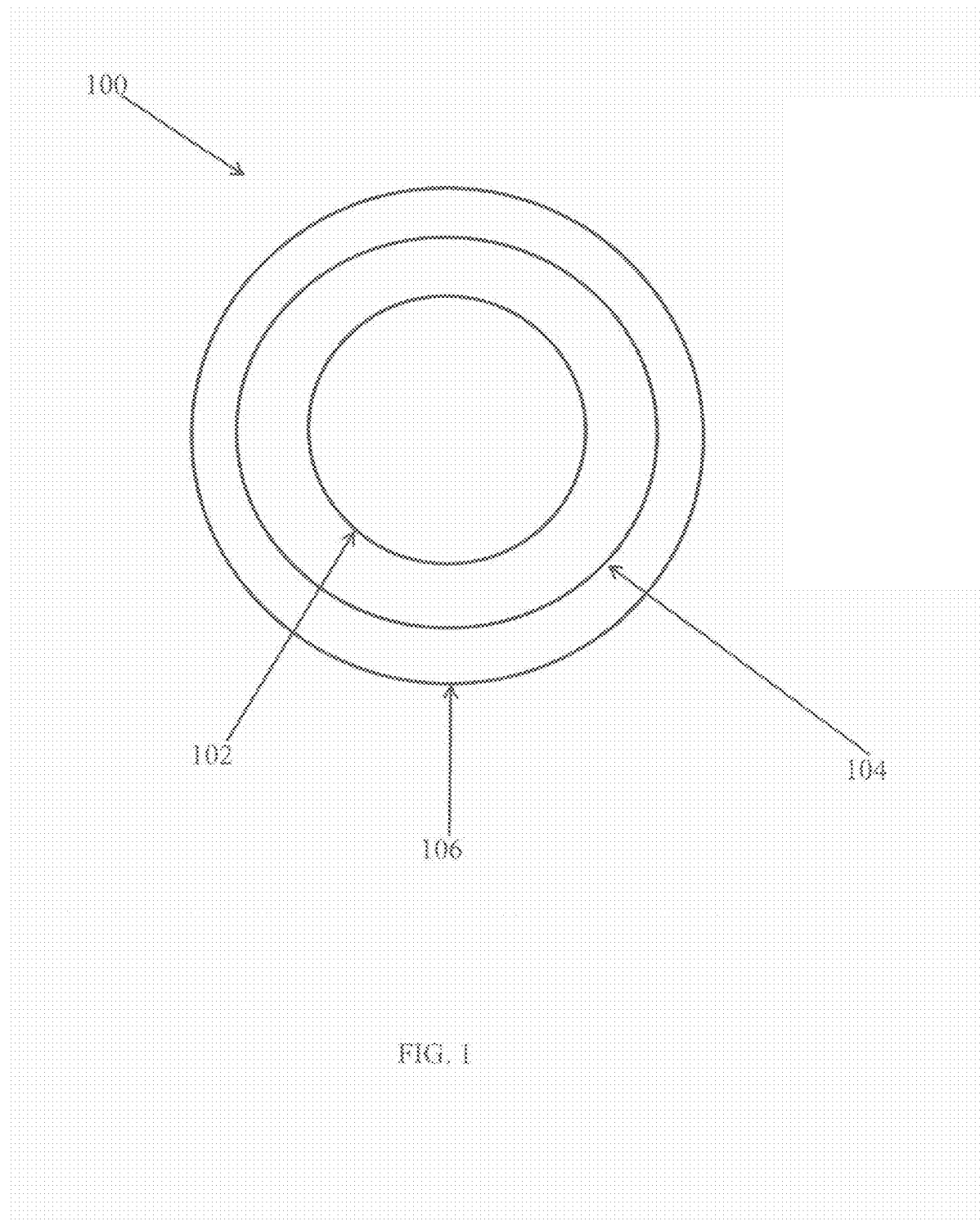
FIG. 1 provides a cross-sectional view of one example of a fertilizer particle in accordance with the present disclosure.

FIG. 1 illustrates one example of a fertilizer particle or granule prepared in accordance with some embodiments of the present disclosure. While FIG. 1 illustrates the fertilizer particle as having an idealized, generally circular cross section for simplicity of illustration, it should be understood that fertilizer particles in practice have varied and irregular shapes. The fertilizer product 100 as illustrated in FIG. 1 includes a base fertilizer particle 102, an optional inner coating 104, and an outer coating 106. The outer coating 106, as will be described in greater detail below, includes the above-noted polyethylene- or polypropylene-based polymers.

The base fertilizer particle 102 may be any suitable fertilizer particle formed by any suitable process. For example, the base fertilizer particle 102 may include any suitable fertilizing component that may be produced or sold in bulk and may additionally be coated with another material. The base fertilizer particle 102 may include, for example, one or more fertilizing components including nitrogen, phosphorous, potassium, potash, urea, ammonium salts including ammonium sulfate, ammonium nitrate, ammonium sulfate nitrate, and combinations thereof. The base fertilizer particle 102 may be formed by processes including, but not limited to, crystallization, granulation, or prilling.

Once the base fertilizer particle has been provided, the optional inner coating 104 may be applied to the base fertilizer particle to form a fertilizer-additive particle. The optional inner coating 104 may include at least one layer that includes at least one additive, such as an agrochemical. Any additive used may or may not be dissolvable in a liquid solvent, such as water. When the additive is a liquid, or is dissolvable in a liquid, the layer of the inner coating 104 that includes the additive may be applied as a liquid to the base fertilizer particle 102. When the additive is a solid, various methods may be used for forming and applying the layer of the inner coating 104 that includes the additive. For example, some solid additives may be applied by mixing them with a binding agent and then applying the mixture as a coating to the base fertilizer particle 102.

The outer coating 106 may be selected to bond with the fertilizer particle 102, or with the optional inner coating 104 if present. The outer coating 106 may be selected from wax-based coatings or oil-based coatings. In accordance with an exemplary embodiment, the outer coating 106 may be provided as an oil- or wax-based coating, such as those conventionally known in the art, that has been modified with the addition of one or more polyethylene- or polypropylene-based polymers. The one or more polymers may be added to the oil- or wax-based coating in an amount, by total weight of the outer coating 106, of about 1% to about 15%, preferably from about 3% to about 12%, and more preferably from about 5% to about 10%. A discussion of an exemplary oil- or wax-based materials for the outer coating 106 is first provided below, followed by a discussion of exemplary polyethylene- or polypropylene-based polymers that may be added to the exemplary oil- or wax-based outer coating 106.

Oil- or Wax-based Coating

In general, any oil- or wax-based coating known in the art may be used in connection with the embodiments described herein. Common commercially available oil- or wax-based coating agents suitable for use herein include Galoryl™ alkyl-aryl sulphonates, anionic and nonionic surfactants (sold by ArrMaz Industries), Lilamine™ and Armoflo™ fatty amine coatings (sold by Akzo Nobel), Petro-Ag™ (an amine based coating marketed by Witco Corporation), Nalco™ (another amine based coating marketed by IWC Stockhausen) and Radiamine™ (sold by Fina Chemicals).

In a preferred embodiment, the oil- or wax-based coating is provided as a mineral oil, paraffin wax, or combination thereof, which has been modified with an "active" hydrophobic agent. Suitable paraffin waxes are those whose melting point is from about 48 to about 80° C. and suitable mineral oils are those whose kinematic viscosities are from about 20 to about 800 mm$^2$/s, preferably from about 20 to about 150 mm$^2$/s, at 40° C. The active hydrophobic agent may be provided as the reaction product of an alcohol or an amine with a carboxylic acid or anhydride bearing a hydrocarbon group having about 20 to about 500 carbon atoms. For example, the active hydrophobic agent may be produced as the result of the reaction of an alcohol, an amine, or an alkanolamine with a carboxylic acid of the group including acrylic acid, fumaric acid, maleic and succinic acids or their anhydrides, wherein such acid or anhydride bears a hydrocarbon group including alkyl or alkenyl groups, with the isobutyl group being particularly preferred. In an exemplary embodiment, this active hydrophobic agent may be incorporated into the paraffin wax and/or mineral in an amount from about 0.1% to about 10% by weight of the oil- or wax-based coating (exclusive of the polymer), preferably from about 0.5% to about 8%, more preferably from about 1% to about 7%, and even more preferably from about 2% to about 5%. An oil- or wax-based coating as described above in this particular embodiment is commercially available as Galoryl™ ATH-632, sold by the ArrMaz chemical company of Mulberry, Fla., USA.

Polyethylene- or Polypropylene-based Polymers

Polyethylene- or polypropylene-based polymers are added to the oil- or wax-based coating as described above. Again, they may be added in an amount, by total weight of the outer coating 106, of about 1% to about 15%, preferably from about 3% to about 12%, and more preferably from about 5% to about 10%. Polyethylene- or polypropylene-based polymers in accordance with the present disclosure may be provided as polyethylene homopolymers, oxidized polyethylene polymers, maleated polyethylene polymers, ethylene/vinyl acetate copolymers, ethylene/acrylic acid copolymers, polypropylene homopolymers, maleated polypropylene polymers, and combinations and mixtures thereof. Each of these various categories of polyethylene- or polypropylene-based are described in greater detail in the paragraphs that follow.

Polyethylene homopolymers suitable for use in accordance with the present disclosure encompass a range of low-density polyethylene (LDPE) to high-density polyethylene (HDPE) homopolymers. These polyethylene homopolymers are characterized as having drop points (determined in accordance with ASTM D-3954; all references to drop points hereinafter will be determined in accordance with this ASTM standard) of from about 85° C. to about 125° C., hardnesses (determined in accordance with ASTM D-5) of from less than about 0.5 decimillimeters (dmm) to about 7.5 dmm (or up to about 98 dmm when determined in accordance with ASTM D-1321), and viscosities at 140° C. of from about 20 centiPoise (cps) to about 6,000 cps. Exemplary polyethylene homopolymers may also be characterized as highly-branched and amorphous. Non-limiting, commercially-available examples of such polyethylene homopolymers include A-C® 1702, A-C® 6, A-C® 8A-C® 9, A-C® 617, A-C® 820, A-C® 1810A, A-C® 16, A-C® 7, A-C® 15, A-C® 715, A-C® 735, and A-C® 725, among others, all available from Honeywell International Inc. of Morristown, N.J., USA (all references hereinafter to A-C®-branded polymers are commercially available from Honeywell International Inc.). Polypropylene homopolymers suitable for use in accordance with the present disclosure have drop points of from about 140° C. to about 170° C., hardnesses of less than about 0.5 dmm (determined in accordance with ASTM D-5), and viscosities at 190° C. of from about 40 cps to about 2000 cps. Non-limiting examples of such a polypropylene homopolymer include A-C® 1089, A-C® 1754, A-C® 1172, and A-C® 1660.

Oxidized polyethylene polymers suitable for use in accordance with the present disclosure also encompass a range of LDPE and HDPE polymers. These oxidized polyethylene polymers have drop points of from about 85° C. to about 140° C., hardnesses (determined in accordance with ASTM D-5) of from less than about 0.5 dmm to about 6.0 dmm (or up to about 90 dmm when determined in accordance with ASTM D-1321), and viscosities at 140° C. of from about 35 cps to about 400 cps at 140° C. for low density oxidized polymers and about 2,500 cps to about 85,000 cps at 150° C. for high density oxidized polymers. Non-limiting, commercially-available examples of such oxidized polyethylene polymers include A-C® 629, A-C® 673P, A-C® 395, A-C® 6702, A-C® 656, A-C® 655, A-C® 307, A-C® 316, A-C® 325, A-C® 392, A-C® 330, and A-C® 680.

Maleated polyethylene and polypropylene polymers suitable for use in accordance with the present disclosure have drop points of from about 90° C. to about 170° C., hardnesses (determined in accordance with ASTM D-5) of from less than about 0.5 dmm to about 5.0 (or up to about 100 dmm when determined in accordance with ASTM D-1321), and viscosities at 140° C. from about 45 cps to about 7,000 cps (for polyethylene polymers) and 190° C. of from about 150 cps to about 5,000 cps (for polypropylene propylene polymers). Non-limiting, commercially-available examples of such maleated polymers include A-C® 573 and A-C® 575 (polyethylene), and A-C® 597, A-C® 907, A-C® 950, A-C® 1325, and A-C® 596 (polypropylene).

Copolymers of ethylene, such as ethylene/vinyl acetate, ethylene/acrylic acid, ethylene methacrylic acid, and ethylene/carbon monoxide suitable for use in accordance with the present disclosure have drop points of from about 95° C. to about 110° C., hardnesses (determined in accordance with ASTM D-5) of from about 1.5 dmm to about 5.5 dmm, and viscosities at 140° C. of from about 500 cps to about 700 cps. Non-limiting, commercially-available examples of such copolymers include A-C® 405M (ethylene/vinyl acetate), A-C® 540 (ethylene/acrylic acid), A-C® 645 (oxidized ethylene/vinyl acetate), AClyn® 201, 295, 246, and 285 (all ionomers of ethylene/acrylic acid), which are available from Honeywell International Inc., ACter® 1450 (terpolymer of ethylene/acrylic acid/vinyl acetate), which is available from Honeywell International Inc., ACtol® polymers (hydroxyl functionalized ethylene/vinyl acetate), also available from Honeywell International Inc., and nylon-grafted ethylene/acrylic acid copolymers.

The above-described polymer materials are typically provided in powder or wax form. For purposes of incorporation into the oil- or wax-based coating, it is contemplated that the polymer materials disclosed herein may be dissolved in at least one solvent in order to formulate the particular compound, prepare the compound for the application, or impart additional chemical properties to the compound. For example, a solvent or solvents may be utilized to impart a rougher or porous surface to the base fertilizer particle 102, in order to naturally retain more of the applied coating.

The outer coating 106 may be applied to the fertilizer granules in accordance with any method known in the art. In general, fertilizer particle coating processes can be divided into two basic types: "batch-type" processes and "continuous" processes. In batch-type processes, a predetermined amount of granules is charged into a coating vessel. After the granules are coated, the process is stopped and the granules are removed for further processing. In continuous processing, on the other hand, a stream of granules is fed into the coating vessel where they are coated and continuously discharged for further processing. In this way, coating can continue without the frequent interruptions needed to load and unload the coating vessel. For this reason, it is generally preferable to utilize continuous processes in manufacturing operations. The amount of outer coating material added to the fertilizer particle (or the fertilizer particle coated with the optional inner coating) generally depends on the size of the fertilizer particle, but will typically be from about 0.1% to about 0.5% based on the weight of the fertilizer particle, preferably from about 0.2% to about 0.3%.

Both batch and continuous processes may be conducted in several types of conventional coating apparatus. One type of apparatus uses a large cylindrical drum as the coating vessel. The particles to be coated are charged into the drum, the drum is rotated, and a coating is applied to the tumbling particles, generally by spraying. A second type of apparatus is a rotary pan. As with the drum coater, the particles are fed onto the pan, the pan is rotated, and the coating is applied to the particles. A third type of coating apparatus is the so-called "fluidized bed." In a fluidized bed, particles are kept in a randomly moving, fluidized condition by a stream of pressurized gas. This is usually accomplished by placing the particles on a perforated metal plate. A pressurized gas is forced through the perforations in the plate, and the gas causes the particles to fluidize. Fluidization is characterized by the particles moving in a random, turbulent fashion similar to a gently boiling liquid. Any of the foregoing methods and apparatuses may be used in accordance with the present disclosure to apply the outer coating to the base particle 102 (or to the optional inner coating 104 when present).

As such, upon completion of the above-described coating process, the result is a coated fertilizer product 100 as illustrated in FIG. 1. The fertilizer product 100 includes the base fertilizer particle 102, the optional inner coating 104, and the outer coating 106. The outer coating 106 includes the above-noted polyethylene- or polypropylene-based polymers, which provides better hydrophobic properties to the fertilizer coating, better adhesion to the granule, and better flow of the coating, leading to a more uniform coating and better moisture resistance. These polymers also lower the coefficient of friction of the coating, allowing faster and easier transport through the farming equipment, and less dusting by decreasing abrasion resulting from particle to particle contact.

ILLUSTRATIVE EXAMPLES

The present disclosure is now illustrated by the following non-limiting examples. It should be noted that various changes and modifications may be applied to the following example and processes without departing from the scope of this invention, which is defined in the appended claims. Therefore, it should be noted that the following examples should be interpreted as illustrative only and not limiting in any sense.

Preparation of the Outer Coating Composition

Galoryl™ ATH-632 wax-based fertilizer coating composition was bottled in glass and heated in an oven to 100° C. While molten, the Galoryl™ material was stirred by hand to increase homogeneity. The material was then poured out in 237.5 gram samples into 250 ml glass beakers. On a heating mantel (hot plate) at 100° C. with agitation, maintaining a vortex at about 30-45 rpm, 12.5 grams of a respective A-C® polymer (as set forth in TABLE 1, below) was added, and the mixture heated until the melt point range of the polymer and the material blend was completely homogeneous. The sample was then stirred at melt point temperature for approximately an additional 10 minutes. The samples were then allowed to cool overnight. The respective A-C® polymers employed, and the melt points, are set forth in TABLE 1, below.

polymer added thereto in the amounts described above, inhibited moisture absorption into the fertilizer granule and formation of bridges between the particles to a greater degree than the wax-based coating alone, which was demonstrated by the improved caking tendency results.

As such, described herein are embodiments of improved fertilizer coatings and improved methods for manufacturing fertilizer coatings. Particularly, the fertilizer coatings that more fully inhibit the uptake of water, thereby reducing the incidence of dusting and caking, than prior art coatings based solely on waxes or oils.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and

TABLE 1

| AC Grade | Lot# | (MSDS) Melt Point ° C. | (Molten W/Additive) Avg. MPR ° C. |
|---|---|---|---|
| AC-6 (Polyethylene Homopolymer) | 000061-085 | 92-126 | 110 |
| AC-9 (Polyethylene Homopolymer) | C972051-001 | 92-126 | 115 |
| AC-1702 (Polyethylene Homopolymer) | 951701-053 | 92-122 | 110 |
| AC-673P (Oxidized Polyethylene Homopolymer) | 33673P1-013 | 88-140 | 115 |
| AC-629 (Oxidized Polyethylene Homopolymer) | 956291-300 | 88-140 | 115 |
| AC-395 (High-Density Oxidized Polyethylene Homopolymer) | 8569503-1191 | 88-140 | 135 |
| AC-1089 (Polypropylene Homopolymer) | 55008-01 | 145-152 | 150 |
| AC-596P (Propylene Maleic Anhydride Copolymer) | 61596P8-001 | 142-152 | 150 |
| AC-575P (Ethylene Maleic Anhydride Copolymer) | 85575P1-008 | 104-107 | 105 |
| AC-540 (Ethylene-Acrylic Acid Copolymer) | 105401-018 | 92-105 | 105 |
| AC-405M (Ethylene-Vinyl Acetate Copolymer) | 334051-009 | 72-102 | 90 |

Caking Tendency Test Results

Figure 2:
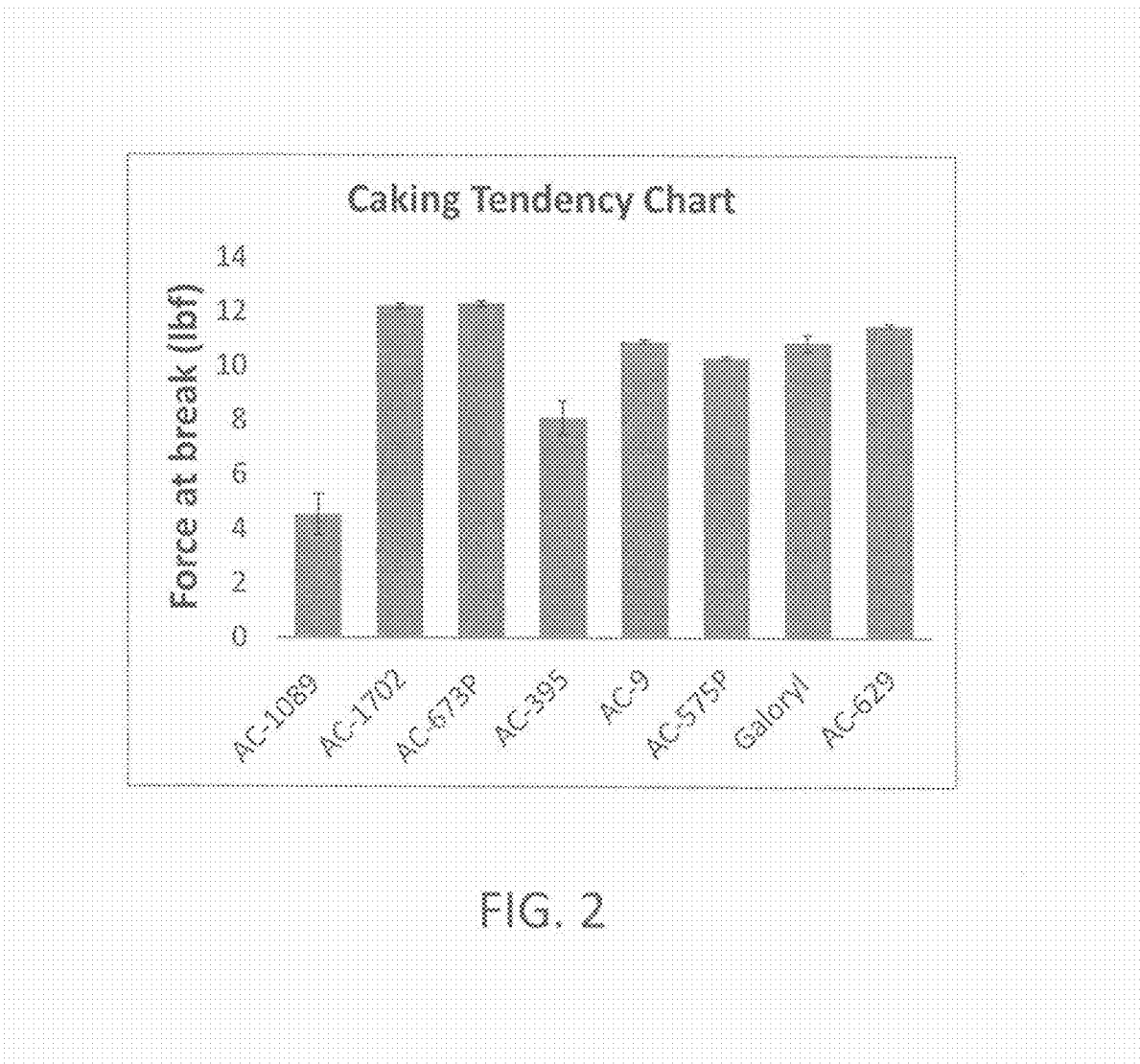
FIG. 2 provides a chart indicating the results of caking tendency experimentation as described in greater detail in the Illustrative Examples section of this disclosure.

Ammonium sulfate fertilizer granules were coated with the eleven exemplary coating compositions described above, as well as a "control" wax-based coating (Galoryl™ ATH-632 alone) that did not include any polymer, using conventional coating methods. The coating compositions were applied to the granules in an amount of about 0.23% by weight of the fertilizer granule. After coating the samples, a small amount of each coated fertilizer was placed in an environmental chamber. These samples were exposed to an environment of 65° C. and 40% relative humidity for a period of 16 hours. This temperature and humidity emulates the moisture exposure that would typically occur over extended storage periods at typical environmental ambient. Caking tendency is generally understood to be proportional to the force required to fracture or "break" the sample, with lower forces indicating less caking tendency. As such, the force required to break each sample was measured at the end of the 16-hour exposure, and expressed as $lb_f$. Force required to break fertilizer coated with Galoryl™ alone (the "control") was very similar to that needed to break samples coated with Galoryl™/AC®-9, Galoryl™/AC®-575P, and Galoryl™/AC®-629. However, an improvement (decrease) in the force required to break material coated with Galoryl™/AC®-1089 and Galoryl™/AC®-395 was observed. FIG. 2 illustrates the obtained results for selected ones of the eleven test samples, along with results for the Galoryl™ control wax-based coating. It is thus hypothesized that the wax-based Galoryl™ coating, with AC®-1089 or AC®-395 arrangement of elements described in an exemplary embodiment without departing from the scope as set forth in the appended claims and their legal equivalents.

What is claimed is:

1. A fertilizer coating composition comprising:
   a wax-based material comprising a paraffin wax, wherein the paraffin wax comprises the reaction product of an alcohol or an amine with a carboxylic acid or anhydride bearing a hydrocarbon group having about 20 to about 500 carbon atoms; and
   a low-density, oxidized polyethylene polymer material, wherein the oxidized polyethylene polymer material comprises about 1% to about 15% by weight of the fertilizer coating composition.

2. The fertilizer coating composition of claim 1, wherein the oxidized polyethylene polymer material is characterized as having a drop point of about 85° C. to about 140° C., a hardness (determined in accordance with ASTM D-5) of less than about 0.5 dmm to about 6.0 dmm, and a viscosity at 140° C. of about 35 cps to about 400 cps.

3. The fertilizer coating composition of claim 1, wherein the oxidized polyethylene polymer material comprises about 5% to about 10% by weight of the fertilizer coating composition.

4. A coated fertilizer composition comprising:
   a fertilizer granule; and
   a hydrophobic coating material coated on the fertilizer granule, wherein the hydrophobic coating material comprises:

a wax-based material; and a low-density, oxidized polyethylene polymer material, wherein the oxidized polyethylene polymer material comprises about 1% to about 15% by weight of the fertilizer coating composition, wherein the oxidized polyethylene polymer material is characterized as having a drop point of about 85° C. to about 140° C., a hardness (determined in accordance with ASTM D-5) of less than about 0.5 dmm to about 6.0 dmm, and a viscosity at 140° C. of about 35 cps to about 400 cps.

5. The coated fertilizer composition of claim 4, wherein the oxidized polyethylene polymer material comprises about 5% to about 10% by weight of the fertilizer coating composition.

6. The coated fertilizer composition of claim 4, wherein the wax-based material comprises a paraffin wax.

7. The coated fertilizer composition of claim 6, wherein the paraffin wax comprises the reaction product of an alcohol or an amine with a carboxylic acid or anhydride bearing a hydrocarbon group having about 20 to about 500 carbon atoms.

8. A method of manufacturing a coated fertilizer composition comprising the steps of:

providing a fertilizer granule; and coating the fertilizer granule with a hydrophobic coating material, wherein the hydrophobic coating material comprises:

a wax-based material; and a low-density, oxidized polyethylene polymer material, wherein the oxidized polyethylene polymer material comprises about 1% to about 15% by weight of the fertilizer coating composition, wherein the oxidized polyethylene polymer material is characterized as having a drop point of about 85° C. to about 140° C., a hardness (determined in accordance with ASTM D-5) of less than about 0.5 dmm to about 6.0 dmm, and a viscosity at 140° C. of about 35 cps to about 400 cps.

9. The method of claim 8, wherein the oxidized polyethylene polymer material comprises about 5% to about 10% by weight of the fertilizer coating composition.

10. The method of claim 8, wherein the wax-based material comprises a paraffin wax.

11. The method of claim 10, wherein the paraffin wax comprises the reaction product of an alcohol or an amine with a carboxylic acid or anhydride bearing a hydrocarbon group having about 20 to about 500 carbon atoms.

* * * * *